(12) United States Patent
Taoka et al.

(10) Patent No.: US 9,694,843 B2
(45) Date of Patent: Jul. 4, 2017

(54) STEERING SYSTEM

(71) Applicants: JTEKT CORPORATION, Osaka-shi, Osaka (JP); HONDA MOTOR CO., LTD., Tokyo (JP)

(72) Inventors: Nobuyuki Taoka, Sakai (JP); Yoshiyuki Maenaka, Kashihara (JP); Nariaki Sakamoto, Yamatokooriyama (JP); Hideo Kometani, Nara (JP); Masashi Fujimoto, Kashihara (JP); Agen Nishikido, Kashihara (JP); Isao Shintani, Kashihara (JP); Takumitsu Otani, Kashihara (JP); Hayato Miyakawa, Wako (JP)

(73) Assignees: JTEKT CORPORATION, Osaka (JP); HONDA MOTOR CO., LTD., Tokyo (JP)

( * ) Notice: Subject to any disclaimer, the term of this patent is extended or adjusted under 35 U.S.C. 154(b) by 14 days.

(21) Appl. No.: 14/934,928

(22) Filed: Nov. 6, 2015

(65) Prior Publication Data

US 2016/0129931 A1 May 12, 2016

(30) Foreign Application Priority Data

Nov. 6, 2014 (JP) ................................. 2014-226251

(51) Int. Cl.
*B62D 3/12* (2006.01)
*F16C 29/02* (2006.01)
*F16H 55/26* (2006.01)

(52) U.S. Cl.
CPC .............. *B62D 3/126* (2013.01); *B62D 3/12* (2013.01); *F16C 29/02* (2013.01); *F16H 55/26* (2013.01); *F16C 2326/24* (2013.01)

(58) Field of Classification Search
CPC ....... B62D 3/12; B62D 3/126; F16C 2326/24; F16C 29/02; F16H 55/26; F16H 2055/281
See application file for complete search history.

(56) References Cited

U.S. PATENT DOCUMENTS 3,753,375 A * 8/1973 Colletti ................... B62D 3/02
74/396
4,106,363 A 8/1978 Buckingham
(Continued)

FOREIGN PATENT DOCUMENTS

DE 10252056 A1 5/2004
DE 102006062241 A1 6/2008
(Continued)

OTHER PUBLICATIONS

Mar. 22, 2016 Extended Search Report issued in European Patent Application No. 15193450.2.

*Primary Examiner* — Laura Freedman
(74) *Attorney, Agent, or Firm* — Oliff PLC

(57) ABSTRACT

A rack-and-pinion steering system includes a pinion shaft having pinion teeth, a rack shaft on which rack teeth are formed which mesh with the pinion teeth; and a rack bush which supports the rack shaft slidably in an axial direction thereof. An outer circumferential surface of the rack shaft includes a first area which is a concave formed on an outer circumferential surface of the rack shaft and extending in the axial direction and a second area which is an area of the outer circumferential surface excluding the first area and lies adjacent to an end portion of the first area in the axial direction. The rack teeth are formed in the first area. A chamfered portion or a rounded portion is provided on a boundary between the end portion of the first area and the second area to chamfer or round a corner portion on the boundary.

2 Claims, 5 Drawing Sheets

(56) References Cited

U.S. PATENT DOCUMENTS

| | | | | |
|---|---|---|---|---|
| 4,724,717 A * | 2/1988 | Chikuma | ............... | B62D 3/123 74/422 |
| 5,473,960 A * | 12/1995 | Sakamoto | ............... | B21K 1/768 148/572 |
| 6,317,979 B1 * | 11/2001 | Yamawaki | ............... | B21K 1/767 29/893.34 |
| 6,390,230 B1 * | 5/2002 | Shimizu | ................ | B21K 1/767 180/444 |
| 6,442,992 B2 * | 9/2002 | Tsubouchi | ............. | B21D 15/04 29/893.34 |
| 6,499,753 B2 * | 12/2002 | Irvine | ...................... | B62D 3/12 180/400 |
| 6,588,293 B2 * | 7/2003 | Tsubouchi | ............. | B21K 1/767 74/422 |
| 6,763,739 B2 * | 7/2004 | Tsubouchi | ............. | B21K 1/767 74/422 |
| 6,782,598 B2 * | 8/2004 | Tsubouchi | ............ | B21C 37/155 29/469.5 |
| 6,845,560 B2 * | 1/2005 | Tsubouchi | ............ | B21C 37/155 29/893.3 |
| 6,925,899 B2 * | 8/2005 | Ozeki | .................... | B21K 1/767 74/109 |
| 7,654,165 B2 * | 2/2010 | Roeske | ...................... | B21J 5/12 29/893.34 |
| 7,662,245 B2 * | 2/2010 | Ohta | ...................... | B62D 3/126 148/320 |
| 7,775,135 B2 * | 8/2010 | Gabel | ...................... | B62D 3/12 74/409 |
| 7,886,567 B2 * | 2/2011 | Dohmann | ................. | B21J 5/12 29/893.34 |
| 7,950,153 B2 * | 5/2011 | Dohmann | ................. | B21J 5/12 29/893.34 |
| 8,104,369 B2 * | 1/2012 | Yamawaki | .............. | B21C 5/003 29/897.2 |
| 8,156,781 B2 * | 4/2012 | Kobayashi | ............. | B21D 15/04 29/893.34 |
| 9,341,216 B2 * | 5/2016 | Bussit | .................... | F16C 35/073 |
| 2008/0127762 A1 * | 6/2008 | Baxter | ................... | B62D 3/126 74/422 |
| 2009/0301245 A1 | 12/2009 | Eckstein | | |
| 2013/0340554 A1 * | 12/2013 | Nomura | ................... | F16H 55/26 74/422 |
| 2014/0083223 A1 * | 3/2014 | Nomura | ................... | F16H 19/04 74/422 |
| 2015/0298721 A1 * | 10/2015 | Suzuki | .................... | B62D 3/126 74/457 |
| 2016/0001352 A1 * | 1/2016 | Hagiwara | ................ | B62D 3/12 74/422 |
| 2016/0131242 A1 * | 5/2016 | Taoka | .................... | F16H 55/26 74/422 |
| 2016/0273641 A1 * | 9/2016 | Mitsui | .................... | B62D 3/126 |
| 2017/0050666 A1 * | 2/2017 | Kawakubo | ............. | B62D 3/126 |

FOREIGN PATENT DOCUMENTS

| | | | |
|---|---|---|---|
| EP | 1215102 A2 | | 6/2002 |
| JP | 57030662 A | * | 2/1982 |
| JP | 57073269 A | * | 5/1982 |
| JP | 03138042 A | * | 6/1991 |
| JP | 06246379 A | * | 9/1994 |
| JP | 2004359009 A | * | 12/2004 |
| JP | 2008137473 A | * | 6/2008 |
| JP | 2014-084002 A | | 5/2014 |

* cited by examiner

US 9,694,843 B2

STEERING SYSTEM

CROSS REFERENCE TO RELATED APPLICATIONS

This application is based on Japanese Patent Application (No. 2014-226251) filed on Nov. 6, 2014, the contents of which are incorporated herein by way of reference.

BACKGROUND

The present invention relates to a rack-and-pinion steering system.

A steering system described in Patent Literature 1 below includes a rack shaft in which a first rack and a second rack are aligned in an axial direction. A first pinion on a first pinion shaft which transmits a steering assisting force meshes with the first rack, and a second pinion on a second pinion shaft which transits a manual steering force meshes with the second rack.

A first rack bush is disposed at a first end portion of the rack shaft, and a second rack bush is disposed between the first rack and the second rack of the rack shaft. The first rack bush and the second rack bush each include an annular portion which surrounds the whole circumference of the rack shaft and a portion having an arc-shaped section which extends in an axial direction from the annular portion. An elastic projecting portion formed on an inner circumference of the portion having the arc-shaped section is in contact with a back portion on an outer circumferential surface of the rack shaft where the first rack and the second rack are not formed. This enables the first rack bush and the second rack bush to support the rack shaft so as to slide in the axial direction.

[Patent Literature 1] JP-A-2014-84002

SUMMARY

The invention has been made in view of the background of the conventional steering system and an object thereof is to provide a steering system which can restrict a rack bush from being cut by a rack shaft.

According to a first aspect of the invention, there is provided a rack-and-pinion steering system including:

a pinion shaft having pinion teeth;

a rack shaft on which rack teeth are formed which mesh with the pinion teeth; and a rack bush which supports the rack shaft so that the rack shaft slides in an axial direction of the rack shaft, wherein an outer circumferential surface of the rack shaft includes a first area which is a concave formed on an outer circumferential surface of the rack shaft and extending in the axial direction and a second area which is an area of the outer circumferential surface excluding the first area and lies adjacent to an end portion of the first area in the axial direction, the rack teeth are formed in the first area, and a chamfered portion or a rounded portion is provided on a boundary between the end portion of the first area and the second area to chamfer or round a corner portion on the boundary.

According to a second aspect of the invention, in the steering system according to the first aspect of the invention, the rack bush may include a teeth side support portion configured to bring into contact with the second area so as to support the rack shaft from a side where the rack teeth are formed.

According to a third aspect of the invention, in the steering system according to the first aspect of the invention, the chamfered portion may be provided on the boundary to chamfer the corner portion.

DETAILED DESCRIPTION OF EXEMPLIFIED EMBODIMENTS

A sharpened tip exists on a corner portion on a boundary between an axial end portion of an area where rack teeth are formed such as the first rack and the second rack and another area which lies adjacent to the end portion along an axial direction on the outer circumferential surface of the rack shaft in the steering system of Patent Literature 1 above. Because of this, when this corner portion passes underneath the rack bush as the rack shaft moves, there are fears that the corner portion cuts an inner circumferential surface of the annular portion of the rack bush.

The invention has been made in view of the background of the conventional steering system and an object thereof is to provide a steering system which can restrict a rack bush from being cut by a rack shaft.

Hereinafter, embodiments of the invention will be described in detail by reference to the accompanying drawings.

Figure 1:
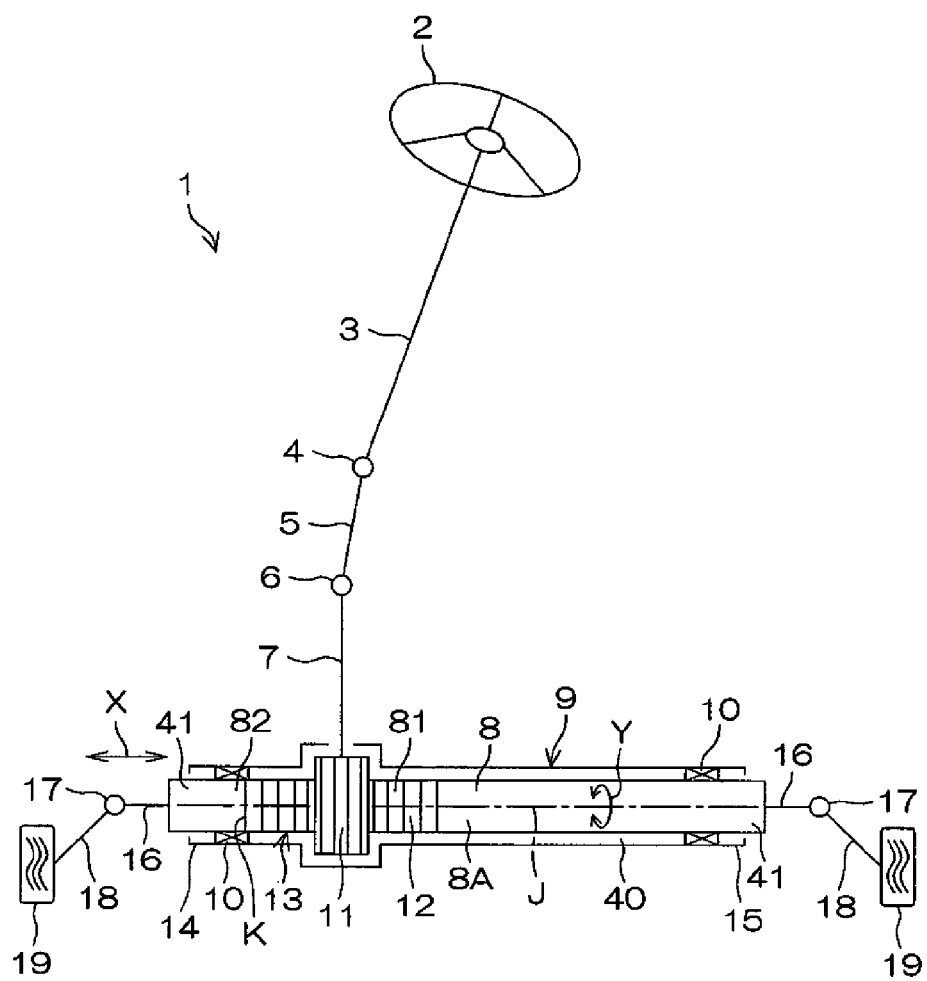
FIG. 1 is a schematic diagram showing a schematic configuration of a steering system of an embodiment of the invention.

FIG. 1 is a schematic diagram showing a schematic configuration of a steering system 1 of an embodiment of the invention. Referring to FIG. 1, the steering system 1 includes mainly a steering member 2 such as a steering wheel, a steering shaft 3, a first universal joint 4, an intermediate shaft 5, a second universal joint 6, a pinion shaft 7, a rack shaft 8, a housing 9, and rack bushes 10.

The steering shaft 3 is connected to the steering member 2. The steering shaft 3 and the intermediate shaft 5 are connected together via the first universal joint 4. The intermediate shaft 5 and the pinion shaft 7 are connected together via the second universal joint 6.

The pinion shaft 7 is formed of metal. Pinion teeth 11 are provided on an outer circumferential surface of an opposite end portion of the pinion shaft 7 to the end portion where the second universal joint 6 is connected.

The rack shaft 8 is formed of metal and is formed substantially into a cylindrical shape having an axis J which extends in a vehicle's width direction of a body (not shown) on which the steering system 1 is provided. The axis J passes through a center of a circular cross section of the rack shaft 8. The vehicle's width direction is a left-to-right direction in FIG. 1 and is also an axial direction X of the rack shaft 8. In the following description, a circumferential direction around the axis J will also be referred to as a "circumferential direction Y."

Rack teeth 12 are formed only on a first area 81 which is one portion on an outer circumferential surface 8A of the rack shaft 8 in the circumferential direction Y and which is a halfway portion of the rack shaft 8 in the axial direction X. The pinion shaft 7 is disposed in a direction (an up-to-down direction in FIG. 1) which intersects the rack shaft 8 which extends in the axial direction X, and the pinion teeth 11 on the pinion shaft 7 mesh with the rack teeth 12 on the rack shaft 8. The pinion shaft 7 and the rack shaft 8 make up a rack-and-pinion mechanism 13. Because of this, this steering system 1 is called a rack-and-pinion steering system.

The housing 9 is a longitudinal hollow cylinder which is made of metal such as aluminum and which extends along the axial direction X. The housing 9 is fixed to the body. The rack shaft 8 is accommodated in the housing 9 and can reciprocate along the axial direction X in this state. The portion of the pinion shaft 7 where the pinion teeth 11 are formed is accommodated in the housing 9 between end portions thereof in the axial direction X. Of both the end portions of the housing 9, a first end portion 14, which constitutes a left end portion in FIG. 1, lies relatively near the pinion shaft 7, and a second end portion 15, which constitutes a right end portion in FIG. 1, lies relatively far from the pinion shaft 7.

In the housing 9, two rack bushes 10 are provided in such a way as to hold the pinion shaft 7 therebetween in the axial direction X. Each rack bush 10 is an annular member which fits on the rack shaft 8, and the rack bushes 10 are fixed individually to the first end portion 14 and the second end portion 15 of the housing 9. The rack shaft 8 is supported by these rack bushes 10 so as to slide on the rack bushes 10 in the axial direction X.

Both end portions of the rack shaft 8 accommodated in the housing 9 in the axial direction X project outwards from both ends of the housing 9, and a tie-rod 16 is connected to each end portion of the rack shaft 8. Each tie-rod 16 is connected to a road wheel 19 via a joint 17 and a knuckle arm 18.

When the steering member 2 is turned by the driver to rotate the steering shaft 3, the rotation is converted to a linear or straight line motion of the rack shaft 8 along the axial direction X by the rack-and-pinion mechanism 13. This turns the road wheels 19.

Figure 2:
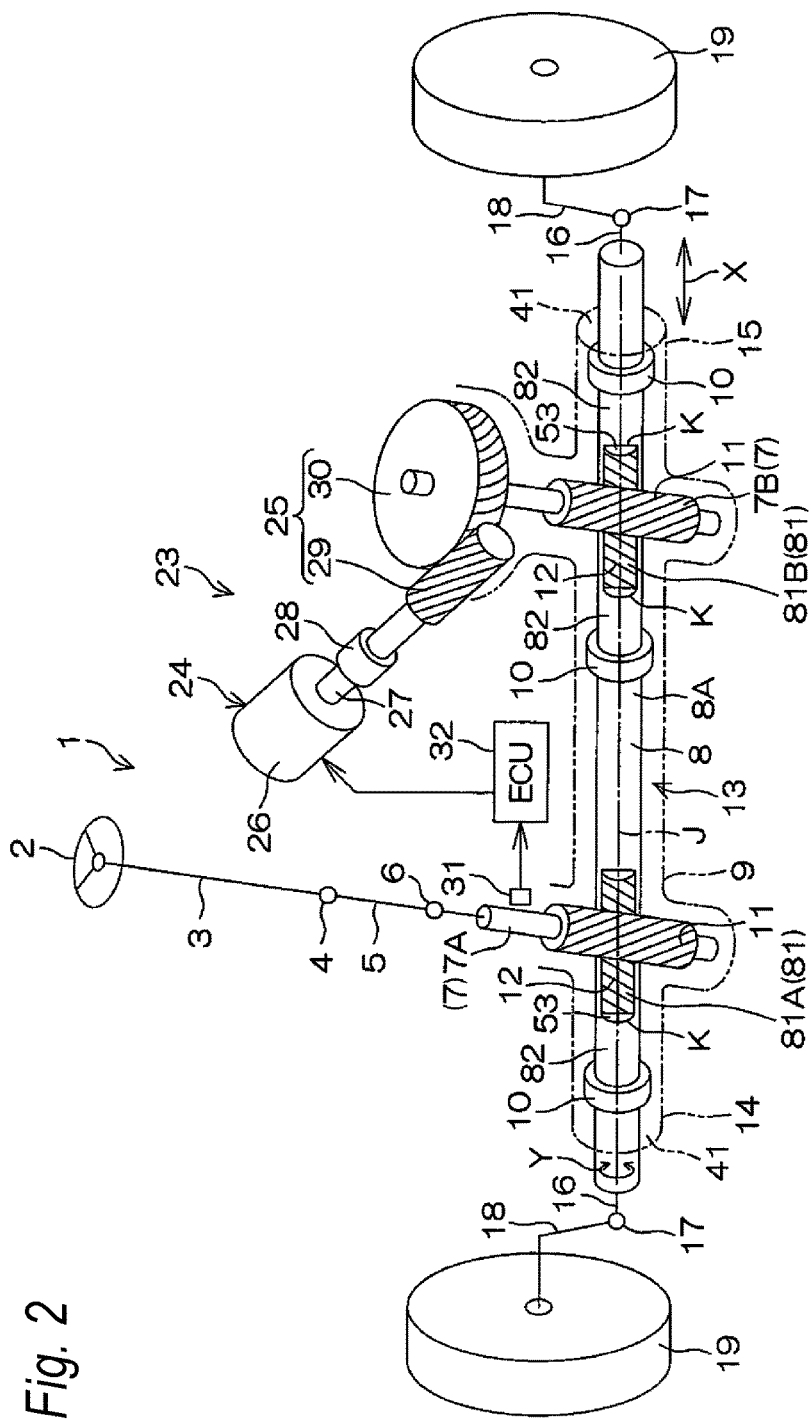
FIG. 2 is a schematic diagram showing a schematic configuration of a steering system of another embodiment of the invention.

FIG. 2 is a schematic diagram showing a schematic configuration of a steering system 1 according to another embodiment of the invention. As to the steering system 1, in addition to the single pinion type which has the single pinion shaft 7 as shown in FIG. 1, there exists a dual pinion type which has two pinion shafts 7 as shown in FIG. 2. In FIG. 2, like reference numerals will be given to like members to those described heretofore and the description thereof will be omitted here.

In the steering system 1 in FIG. 2, of two pinion shafts 7, one is a first pinion shaft 7A which is connected to an intermediate shaft 5 via a second universal joint 6 as described above, and the other is a second pinion shaft 7B which is separate from the first pinion shaft 7A.

In a rack shaft 8, two first areas 81 where rack teeth 12 are formed exist at two portions which are aligned in an axial direction X according to the number of pinion shafts 7. Of the two first areas 81, the rack teeth 12 of one first area 81A mesh with pinion teeth 11 of the first pinion shaft 7A, and the rack teeth 12 of the other first area 81B mesh with pinion teeth 11 of the second pinion shaft 7B.

In this embodiment, in total, three rack bushes 10 like the rack bushes 10 described in the previous embodiment are provided in a housing 9 in such a way as to, for example, hold the individual first areas 81 in the axial direction X. Namely, the two rack bushes 10 are provided individually at a first end portion 14 and a second end portion 15 of the housing 9, and the other rack bush 10 is provided in a position lying between the first area 81A and the first area 81B. The rack bushes 10 each fit on the rack shaft 8 to support the rack shaft 8 so as to slide in the axial direction X.

In relation to the second pinion shaft 7B, the steering system 1 includes a steering assist mechanism 23. The steering assist mechanism 23 includes an electric motor 24 which generates a steering assisting force, and a speed reducing mechanism 25 which decelerates a rotational output of the electric motor 24 and transmits it to the second pinion shaft 7B.

The electric motor 24 includes a motor housing 26 which is fixed to the body and a rotational shaft 27 which functions as an output shaft. The speed reducing mechanism 25 includes a drive gear 29 such as a worm shaft which is connected to the rotational shaft 27 via a joint 28 so as to transmit torque and a driven gear 30 such as a worm wheel which is connected so as to rotate together with the second pinion shaft 7B while meshing with the drive gear 29.

The steering system 1 includes further a torque sensor 31 which detects steering torque exerted on a steering member 2 by the driver and an ECU (Electronic Control Unit) 32 to which the results of a torque detection by the torque sensor 31 are given. The ECU 32 controls to drive the electric motor 24 via a drive circuit incorporated therein based on the results of the torque detection and the results of a vehicle speed detection given by a vehicle speed sensor (not shown). The output rotation of the electric motor 24 is decelerated via the speed reducing mechanism 25 to be transmitted to the second pinion shaft 7B, where the rotational output of the electric motor 24 is converted to a straight line motion of the rack shaft 8. This assists in turning the steering member 2.

Next, the rack shaft 8, the housing 9 and the rack bushes 10 will be described in detail.

Figure 3:
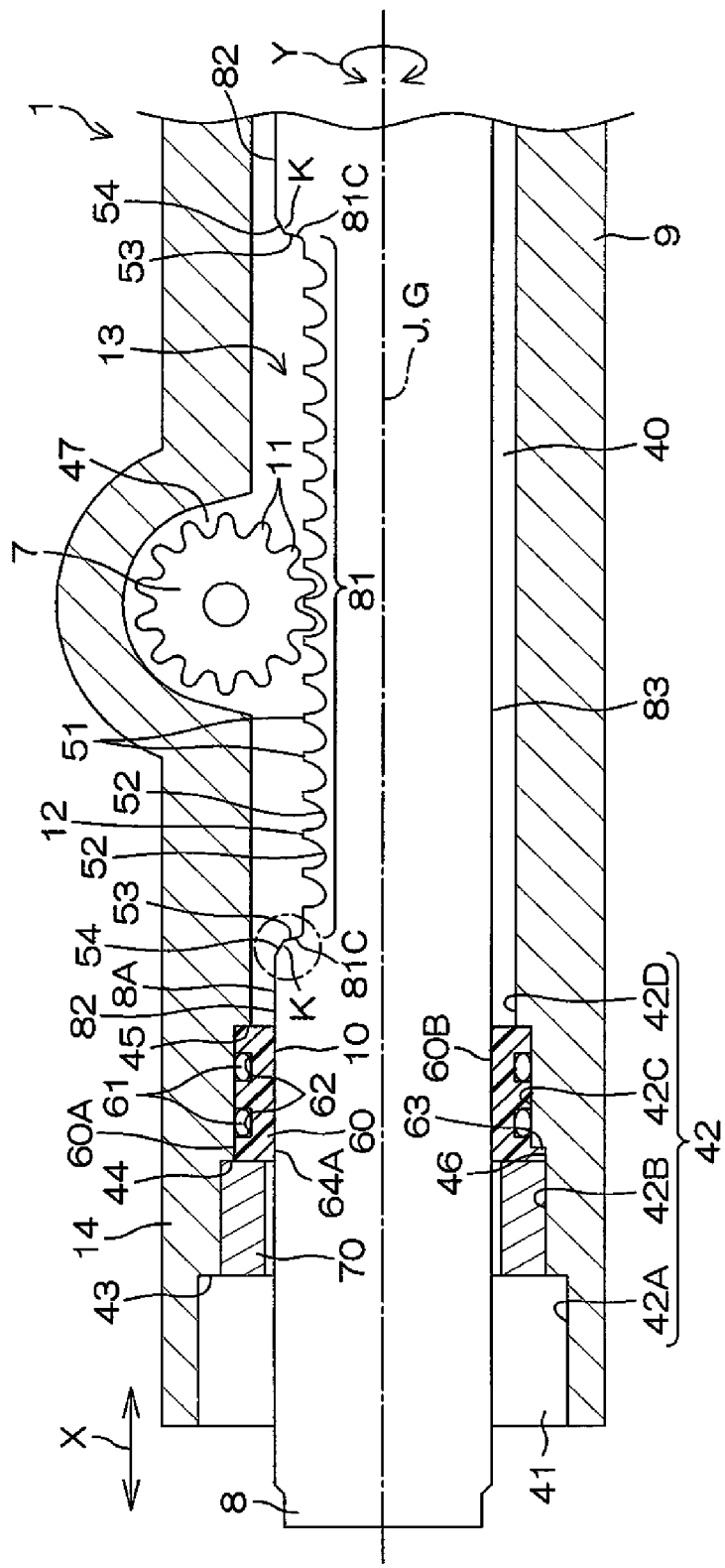
FIG. 3 is a schematic sectional view of a main part of the steering system.

FIG. 3 is a schematic sectional view of a main part taken along the vicinity of the first end portion 14 of the housing 9 of the steering system 1 in the axial direction X. As a matter of convenience in description, no hatching is given to the pinion shaft 7 and the rack shaft 8 in FIG. 3.

Referring to FIG. 3, the housing 9 is the hollow cylinder as has been described before, and a hollow portion 40 is formed into a cylinder having a center line or an axis which extends along the axial direction X. Both ends of the hollow portion 40 in the axial direction X are opened as openings 41 at the first end portion 14 and the second end portion 15 and are exposed to the outside of the housing 9. The openings 41 are round holes which are larger in diameter than the rack shaft 8.

An inner circumferential surface 42 of the housing 9 which defines the hollow portion 40 has a cylindrical shape having a center line or an axis which extends in the axial direction X. The inner circumferential surface 42 includes a first inner circumferential surface 42A which extends continuously from an outline of the opening 41 in the axial direction X, a second inner circumferential surface 42B which is smaller in diameter than the first inner circumferential surface 42A, a third inner circumferential surface 42C which is smaller in diameter than the second inner circumferential surface 42B, and a fourth inner circumferential surface 42D which is smaller in diameter of the third inner circumferential surface 42C. The first inner circumferential surface 42A to the fourth inner circumferential surface 42D are each constant in bore diameter over a whole area in the axial direction X. The fourth inner circumferential surface 42D at the first end portion 14 side and the fourth inner circumferential surface 42D at the second end portion 15 side may continue to each other.

The inner circumferential surface 42, which is configured in the way described above, is reduced in bore diameter step by step as the inner circumferential surface 42 moves away from the opening 41 in the axial direction X in the order of the first inner circumferential surface 42A, the second inner circumferential surface 42B, the third inner circumferential surface 42C and the fourth inner circumferential surface 42D. An annular step portion 43 is formed on a boundary between the first inner circumferential surface 42A and the second inner circumferential surface 42B. An annular step portion 44 is formed on a boundary between the second inner circumferential surface 42B and the third inner circumferential surface 42C. An annular step portion 45 is formed on a boundary between the third inner circumferential surface 42C and the fourth inner circumferential surface 42D. A cutout 46 is formed on one location on a circumference of the step portion 44 so as to cut out continuously the third inner circumferential surface 42C and the step portion 44. A recess portion 47 is formed at a halfway portion on the fourth inner circumferential surface 42D in the axial direction X, and the pinion shaft 7 is accommodated in this recess portion 47.

The rack shaft 8 is substantially the cylinder which extends in the axial direction X, as has been described above. The rack shaft 8 is accommodated in the hollow portion 40 so as to be concentric with the hollow portion 40 of the housing 9. Because of this, the circumferential direction Y of the outer circumferential surface 8A of the rack shaft 8 coincides with a circumferential direction of the inner circumferential surface 42 of the housing 9. The rack shaft 8 is longer than the housing 9 in the axial direction X. Because of this, one end portion (a left end portion in FIG. 3) of the rack shaft 8 projects to the outside of the housing 9 from the opening 41 of the first end portion 14, another end portion of the rack shaft 8 projects to the outside of the housing 9 from the opening 41 of the second end portion 15 (refer to FIGS. 1 and 2).

On the rack shaft 8, the first area 81 where the rack teeth 12 are formed constitutes an area which sinks towards an axis J from the outer circumferential surface 8A of the rack shaft 8 along the axial direction X. A flat surface 51 is formed on the first area 81 as a bottom surface so as to extend along the axial direction X. The flat surface 51 has a substantially rectangular shape which is elongated in the axial direction X (refer to FIG. 4). On the flat surface 51, a plurality of grooves 52 are formed so as to be aligned in the axial direction X, and the grooves 52 extend so as to intersect the axial direction X. A projecting portion held by the adjacent grooves 52 constitutes a rack tooth 12. The flat surface 51 is formed through milling, for example. In milling, a tool (not shown) such as an end mill moves relative to the rack shaft 8 in the axial direction X. As this occurs, an end face 53 is formed as a trace of the tool used at each end portion 81C of the first area 81 in the axial direction X so as to rise from an end edge of the flat surface 51 towards the arc-shaped outer circumferential surface 8A of the other portion of the rack shaft 8 than the first area 81.

Figure 4:
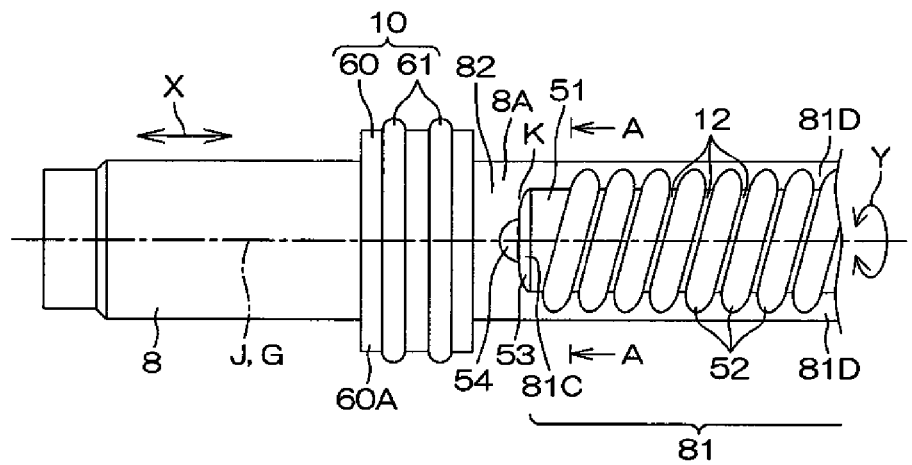
FIG. 4 is a schematic side view of a main part of a rack shaft and a rack push.
Figure 5:
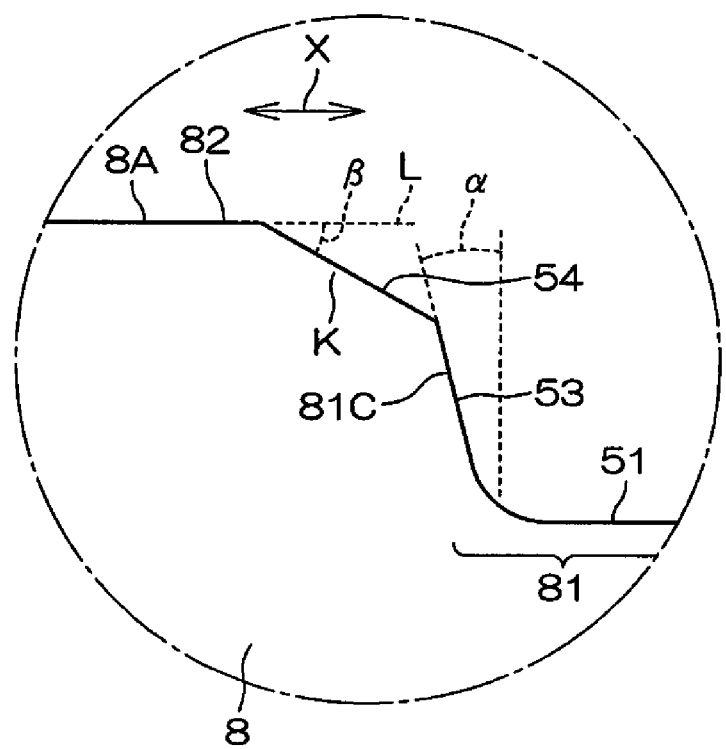
FIG. 5 is an enlarged view of a main part of FIG. 3.

Referring to FIG. 5 in which a portion surrounded by a circle of an alternate long and short dash line in FIG. 3 is enlarged, the end face 53 intersects the flat surface 51 at almost right angles so as to be inclined at a slight inclined or tilt angle α (here, about 15°) with respect to a normal direction to the flat surface 51. Assuming that an area which lies adjacent to the end portion 81C of the first area 81 along the axial direction X on the arc-shaped outer circumferential surface 8A of the rack shaft 8 which excludes the outer circumferential surface corresponding to the first area 81 is referred to as a "second area 82," a chamfered portion 54 is provided at a corner portion K which defines a boundary between the end portion 81C (to be more specific, the end face 53) and the second area 82 so as to chamfer the corner portion K. The chamfered portion 54 is an inclined surface which is inclined at a slight inclined or tilt angle β with respect to an imaginary line L which extends along the outer circumferential surface 8A of the second area 82 in the axial direction X and is provided to extend between the outer circumferential surface 8A of the second area 82 and the end face 53 of the first area 81. When seen in a direction which is at right angles to the axial direction X (a radial direction of the rack shaft 8), the chambered portion 54 is formed into a semicircular shape which expands in a direction in which it moves away from the first area 81 (refer to FIG. 4). In this embodiment, the chamfered portion 54 has a flat planar shape so as to C chamfer the corner portion K as a matter of convenience of milling. However, in place of this, the chamfered portion may have a curved surface shape which R chamfers the corner portion K. In either of the cases, the chamfered portion 54 should connect smoothly the outer circumferential surface 8A of the second area 82 and the end face 53 of the first area 81 so as to round the corner portion K.

Returning to FIG. 3, the rack bush 10 includes a bush main body 60 and a plurality of (here, two) elastic rings 61 (also refer to FIG. 4).

The bush main body 60 is a hollow cylinder of resin, and a hollow portion is opened at both ends in the axial direction. As shown in FIG. 3, with the rack bush 10 built in the steering system 1, an axial direction of the bush main body 60 coincides with the axial direction X described above, and a circumferential direction of the bush main body 60 coincides with the circumferential direction Y described above. In the following description, the bush main body 60 and the elastic rings 61 will be described by the use of the axial direction X and the circumferential direction Y.

A bore diameter of the bush main body 60 is slightly larger than an outside diameter of the rack shaft 8, and an outside diameter of the bush main body 60 is almost equal to a bore diameter of the third circumferential surface 42C of the inner circumferential surface 42 of the housing 9.

In the outer circumferential surface 60A of the bush main body 60, the same number of (here, two) fitting grooves 62 as the number of elastic rings 61 are formed to be aligned in the axial direction X with a space defined therebetween. Each fitting groove 62 is formed so as to extend along the whole area of the outer circumferential surface 60A of the bush main body 60 in the circumferential direction Y and constitutes an annular shape which extends in the circumferential direction Y.

A positioning projection 63 is provided integrally at one circumferential location of one end of the bush main body 60 in the axial direction X so as to project radially outwards of the bush main body 60.

Figure 6:
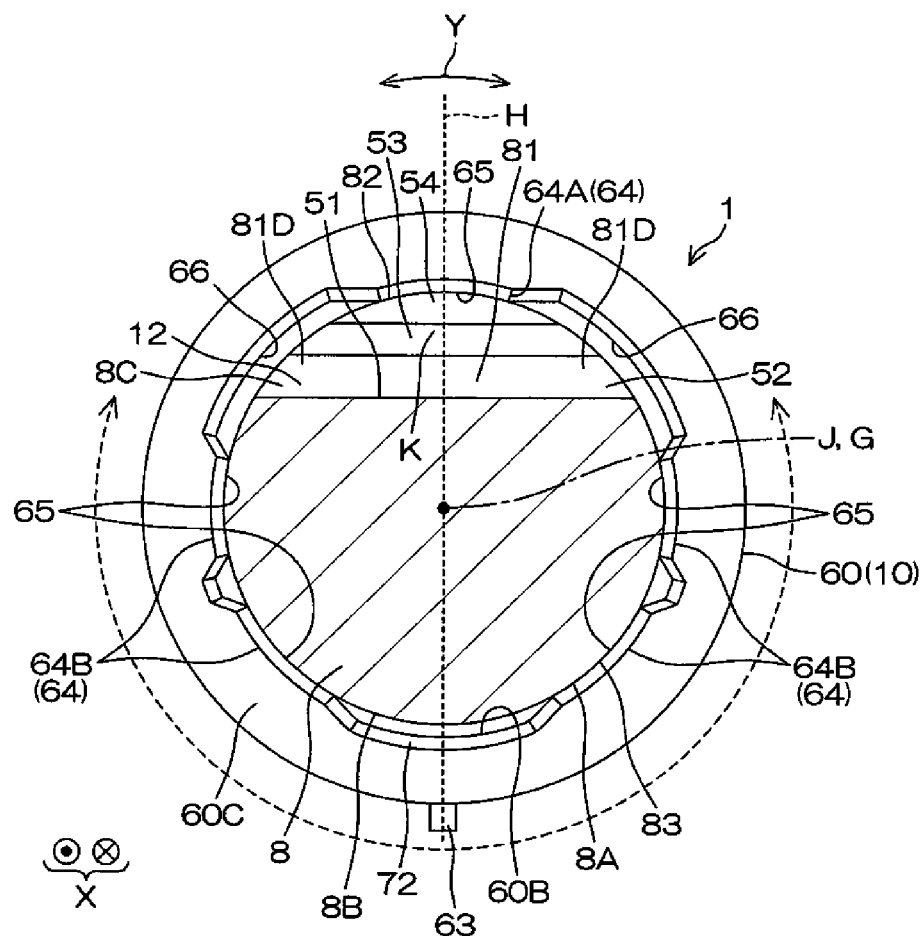
FIG. 6 is a sectional view taken along a line A-A and viewed in a direction indicated by arrows A in FIG. 4.

FIG. 6 is a sectional view taken along a line A-A in FIG. 4. In FIG. 6, a cross section of the rack shaft 8 is shown, while a side view of the bush main body 60 is shown which is seen from a side in the axial direction X. Also, in FIG. 6, an illustration of the elastic rings 61 is omitted. Referring to FIG. 6, a projecting portion 64 is provided integrally on an inner circumferential surface 60B of the bush main body 60 (which is also an inner circumferential surface of the rack bush 10) so as to project towards an axis G of the bush main body 60 which passes through a circular center thereof. A plurality of (here, five) projecting portions 64 are provided to be aligned at intervals in the circumferential direction Y.

In the five projecting portions 64, one projecting portion 64 is a teeth side support portion 64A, and the remaining four projecting portions 64 are back side support portions 64B. In defining an imaginary plane H which passes through a center of the teeth side support portion 64A in the circumferential direction Y and the axis G to extend in the axial direction X, the four back side support portions 64B are disposed so that two back side support portions 64B are disposed on each of sides of the imaginary plane H which are symmetrical with each other across the imaginary plane H. A sinking curved surface 65 which sinks so as to move away from the axis G is formed on each of the teeth side support portion 64A and the back side support portions 64B. A curvature of the sinking curved surface 65 is almost the same as a curvature of the arc-shaped outer circumferential surface 8A of the rack shaft 8 which excludes the first area 81.

A relief portion 66 is formed on the inner circumferential surface 60B of the bush main body 60 to be situated each between the teeth side support portion 64A and the back side support portions 64B which are provided on both sides of the teeth side support portion 64A in such a way as to sink so as to move away from the axis G. One relief portion 66 is situated on each side of the teeth side support portion 64A in the circumferential direction Y and is formed into a groove which cuts out the inner circumferential surface 60B of the bush main body 60 along the axial direction X.

Referring to FIG. 3, the elastic ring 61 is a ring made of elastic material such as rubber. For example, an O ring can be used as the elastic ring 61. A section of the elastic ring 61 which is taken along a plane which is at right angles to the circumferential direction of the elastic ring 61 is, for example, a circular shape. The elastic rings 61 are fitted in the fitting grooves 62 of the bush main body 60 with one for each groove.

The rack bush 10 is accommodated in the hollow portion 40 of the housing 9, and the outer circumferential surface 60A of the bush main body 60 is in surface contact with the third inner circumferential surface 42C of the housing 9. The elastic rings 61 are compressed by the third inner circumferential surface 42C to be deformed. The positioning projection 63 of the bush main body 60 fits in the cutout 46 of the step portion 44 on the inner circumferential surface 42 of the housing 9, whereby the rack bush 10 is positioned with respect to the housing 9 in the circumferential direction Y.

An annular plug 70 is press fitted in the second inner circumferential surface 42B of the housing 9. Alternatively, threads (not shown) are formed on an outer circumferential surface of the plug 70 and the second inner circumferential surface 42B so that the plug 70 is screwed into the second inner circumferential surface 42B. The rack bush 10 is held by the plug 70 and the step portion 45 in the axial direction X, whereby the rack bush 10 is positioned with respect to the housing 9 in the axial direction X. The plug 70 is fitted on the rack shaft 8 in a non-contact fashion.

In the description made heretofore, the rack bush 10 at the first end portion 14 of the housing 9 has been described. However, the other rack bushes 10 which are positioned at the other portions than the first end portion 14 (refer to FIGS. 1, 2) are also positioned with respect to the inner circumferential surface 42 of the housing 9 both in the axial direction X and the circumferential direction Y.

In each rack bush 10, the inner circumferential surface 60B of the bush main body 60 fits on the outer circumferential surface 8A of the rack shaft 8. The rack bush 10 which is fitted on the rack shaft 8 in such a state is located in the same position as the second area 82 near the corner portion K on the boundary between the first area 81 and the second area 82 (the second area 82 which is positioned near the opening 41 in FIG. 3) in the axial direction X. Additionally, the axis J of the rack shaft 8 coincides with the axis G of the bush main body 60. Then, the elastic rings 61 which are compressed as described above support the rack shaft 8 elastically via the bush main body 60.

Referring to FIG. 6, on the inner circumferential surface 60B of the bush main body 60, the teeth side support portion 64A is located in the same position as the first area 81 and the second area 82 on the outer circumferential surface 8A of the rack shaft 8 in the circumferential direction Y. The teeth side support portion 64A is in contact (to be more specific, in surface contact) with the second area 82 at the sinking curved surface 65 thereof, whereby the bush main body 60 supports the rack shaft 8 from the side where the rack teeth 12 are formed (the range which coincides with the first area 81 and the second area 82 in the circumferential direction Y).

Here, an area on the outer circumferential surface 8A of the rack shaft 8 which is situated out of the first area 81 in the circumferential direction Y (an area covered by a broken line in FIG. 6) is defined as a "third area 83," or a "back 8B." The four back side support portions 64B are in contact (to be more specific, in surface contact) with the third area 83 at the respective sinking curved surfaces 65 to thereby support the rack shaft 8 from the other side than the side where the rack teeth 12 are formed, that is, the back 8B side.

In this way, the rack bush 10 supports the rack shaft 8 at the five locations thereon, that is, at the teeth side support portion 64A and the other four back side support portions 64B.

When moving along the axial direction X to turn the road wheels 19, the rack shaft 8 slides on the teeth side support portion 64A and the back side support portions 64B of each rack bush 10.

In the steering system 1 configured in the way described heretofore, as has been described before, on the rack shaft 8, as shown in FIG. 3, the corner portion K on the boundary between the end portion 81C of the first area 81 in the axial direction X and the second area 82 which lies adjacent to the end portion 81C in the axial direction X on the outer circumferential surface 8A is chamfered by the chamfered portion 54 to be free from a sharpened point and hence is made smooth relatively. Because of this, when the corner portion K slides on the rack bush 10 as the rack shaft 8 moves, it is possible to restrict the inner circumferential surface of the rack bush 10 (particularly, the teeth side support portion 64A) from being cut by the corner portion K. Even in a severe condition in which the rack shaft 8 slides while being strongly pressed against the inner circumferential surface 60B of the bush main body 60 as a result of a stationary steering of the steering member 2, the rack bush 10 can be restricted by being cut by the corner portion K. Consequently, the durability of the rack bush 10 can be improved.

As shown in FIG. 6, a chamfered portion 72 is provided on a boundary between an end face 60C of the bush main body 60 in the axial direction X and the inner circumferential surface 60B of the bush main body 60 so as to chamfer a corner portion on the boundary. The rack shaft 8 can move smoothly without being caught by the rack bush 10, and therefore, the cutting of the rack bush 10 by the corner portion K of the rack shaft 8 can be restricted further.

The rack bush 10 can restrict the rack shaft 8 from moving to the back 8B side by the back side support portions 64B, and therefore, it is possible to restrict the generation of a striking sound on the back 8B side which would otherwise be produced as a result of the portion of the rack shaft 8 on the back 8B side striking the inner circumferential surface 42 of the housing 9.

Further, the rack bush 10 can restrict the rack shaft 8 from moving to the pinion shaft 7 by the teeth side support portion 64A. Therefore, it is possible to restrict the generation of a striking sound on the side of the rack shaft 8 where the rack teeth 12 (also including the outer circumferential surface 8A of the second area 82) are formed which would otherwise be produced as a result of the portion of the rack shaft 8 on the side where the rack teeth 12 are formed striking the inner circumferential surface 42 of the housing 9 or the pinion teeth 11.

In particular, the teeth side support portion 64A supports the rack shaft 8 from the side where the rack teeth 12 are formed which constitutes a range coinciding with the first area 81 in the circumferential direction Y, and therefore, the rack bush 10 can restrict the rack shaft 8 from moving to the pinion shaft 7 in an ensured fashion. Thus, the generation of a striking sound on the side where the rack teeth 12 are formed can be restricted effectively.

In addition, the relief portions 66 which are provided on both the sides of the teeth side support portion 64A on the inner circumferential surface 60B of the bush main body 60 coincide with both end portions 81D in the circumferential direction Y of the first area 81 in the circumferential direction Y and sink so as to move away from both the end portions 81D. Because of this, the inner circumferential surface 60B of the bush main body 60 at the relief portions 66 are not in contact with the rack shaft 8 at all times. Consequently, when the rack shaft 8 moves in the axial direction X, the rack teeth 12 at both the end portions 81D of the first area 81 (shoulder portions 8C of the rack shaft 8 in a cross section which is at right angles to the axial direction X) are restricted from interfering with the inner circumferential surface 60B of the rack bush 10, whereby the rack shaft 8 can be moved smoothly.

The invention is not limited to the contents of the embodiments and can be modified variously without departing from the scope of claims.

For example, of the end portions 81C at both the sides of the first area 81A in the axial direction X, the chamfered portion 54 may be omitted at the end portion 81C (the right end portion 81C in FIG. 3) which is not brought in to contact with the rack bush 10.

In addition, while the bush main body 60 of the rack bush 10 has the cylindrical shape which continues in the circumferential direction Y, the bush body 60 may have a C-shaped cross section which is cut in a halfway position in the circumferential direction Y.

The number and location of the teeth side support portion 64A and the back side support portions 64B can be changed arbitrarily.

According to the present invention, the rack teeth are formed on the first area which sinks along the axial direction from the outer circumferential surface on the rack shaft. The corner portion on the boundary between the end portion of the first area in the axial direction and the second area which lies adjacent to the end portion along the axial direction on the outer circumferential surface which excludes the outer circumferential surface corresponding to the first area is chamfered by the chamfered portion, and therefore, the corner portion is not sharpened. Because of this, when this corner portion slides on the rack bush as the rack shaft moves, the rack bush can be restricted from being cut by the corner portion.

According to the present invention, the rack shaft is supported from the side where the rack teeth are formed as a result of the teeth side support portion of the rack bush being brought into contact with the second area. Therefore, the rack shaft can be restricted from moving to the pinion shaft side. This can restrict the generation of a striking sound that would otherwise be generated as a result of the portion of the side of the rack shaft where the rack teeth are formed striking the pinion teeth of the pinion shaft.

What is claimed is:

1. A rack-and-pinion steering system comprising:
  a pinion shaft having pinion teeth;
  a rack shaft on which rack teeth are formed that mesh with the pinion teeth; and
  a rack bush supporting the rack shaft so that the rack shaft slides in an axial direction of the rack shaft, wherein:
    an outer circumferential surface of the rack shaft includes a first area, which is concave, formed on the outer circumferential surface of the rack shaft and extending in the axial direction, and a second area which is an area of the outer circumferential surface excluding the first area, the second area being located adjacent to an end portion of the first area in the axial direction,
    the rack teeth are formed in the first area,
    a chamfered portion or a rounded portion is provided on a boundary between the end portion of the first area and the second area to chamfer or round a corner portion on the boundary, and
    the rack bush includes: (i) a teeth side support portion configured to contact the second area so as to support the rack shaft from a side where the rack teeth are formed, the teeth side support portion projecting in the axial direction of the rack shaft, and (ii) a plurality of back side support portions located on each side of the teeth side support portion in a circumferential direction of the rack shaft and projecting in the axial direction of the rack shaft, the plurality of back side support portions contacting a back side of the rack shaft, the back side of the rack shaft being opposite of the first area in a direction perpendicular to the axial direction.

2. The steering system according to claim 1, wherein the chamfered portion is provided on the boundary to chamfer the corner portion.

* * * * *